E. W. CHALIFOUX.
UNIVERSAL JOINT.
APPLICATION FILED MAR. 1, 1919.

1,311,679.

Patented July 29, 1919.

INVENTOR.
Emil W. Chalifoux
BY Cheever & Cox
ATTORNEY

UNITED STATES PATENT OFFICE.

EMIL W. CHALIFOUX, OF CHICAGO, ILLINOIS.

UNIVERSAL JOINT.

1,311,679.   Specification of Letters Patent.   Patented July 29, 1919.

Application filed March 1, 1919. Serial No. 280,010.

*To all whom it may concern:*

Be it known that I, EMIL W. CHALIFOUX, a citizen of the United States, residing at Chicago, in the county of Cook and State of Illinois, have invented a certain new and useful Improvement in Universal Joints, of which the following is a specification.

My invention relates to universal joints of the type designed to transmit torque, and the object of the invention is to design a simple, powerful and efficient device of this character.

This object is accomplished by the mechanism illustrated in the accompanying drawings, in which Figure 1 is an axial section of the complete device.

Like numerals denote like parts throughout the several views.

Figure 1:
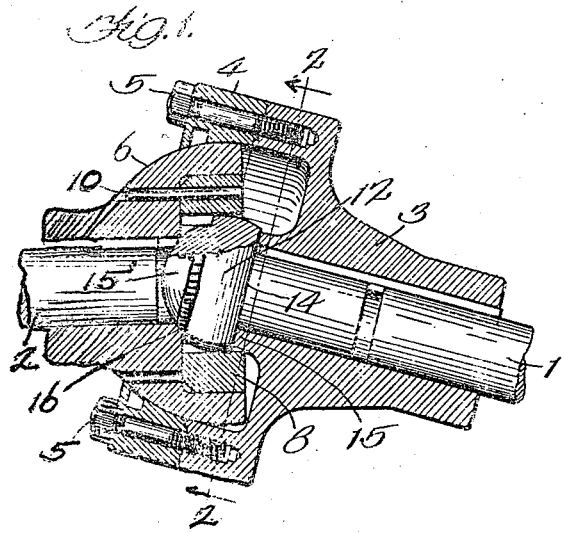
Figure 2:
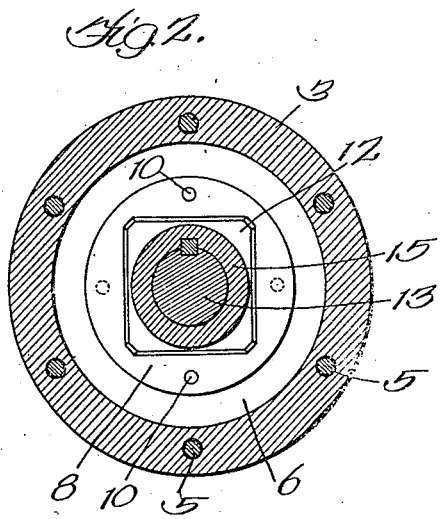
Fig. 2 is a transverse section on the line 2—2, Fig. 1.

The function of the device is to transmit torque from one shaft or other rotating element to another, and while the device is reversible in the sense that either of the two members may constitute the driving member, for convenience I shall regard the shaft 1 as the drive shaft, and the shaft 2 as the driven shaft. Shaft 1 has keyed or otherwise fastened to it a socket member consisting of two principal parts 3 and 4. These parts are secured together by a stud 5 or analogous means. The part 4 is a ring, the inner surface whereof is spherical and fits over the spherical portion of the ball member 6. Said ball member is keyed or otherwise fastened to shaft 2. Parts 3 and 4 meet upon an equatorial plane and hence when the parts are assembled the ring 4 bears upon the ball member and prevents the socket members 3, 4 from being withdrawn over the end of it. The ring 4 is a stout and rugged piece, and performs the dual purpose of a dust cap and a tension resisting member.

Figure 3:
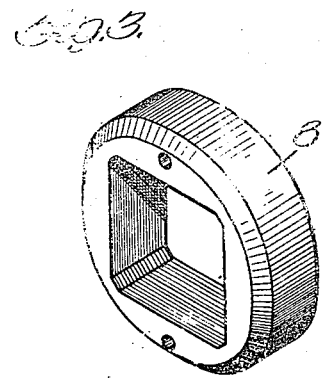
Fig. 3 is a perspective view of the wearing member.

The ball member 6 is recessed at the inner end to receive the wearing element 8. In the form shown (see especially the perspective view, Fig. 3) this wearing member has a cylindrical external surface, although this is non-essential, as a polygonal surface may be substituted. When a cylindrical surface is employed, as shown, it is evident that there will be nothing to prevent rotation of said wearing member about the axis of the ball member and hence to prevent this, I introduce dowel pins 10 or similar fastening means which, as best shown in Fig. 1, lie parallel to the axis of the ball member and penetrate both the ball member and the wearing member. The wearing member has a square opening centrally located within it to receive and coöperate with the driving head 12, shown in perspective in Fig. 4. The wearing member has a central opening co-axial with the ball member 6. In the form illustrated, this opening is square, although other polygonal openings may be substituted.

Figure 4:
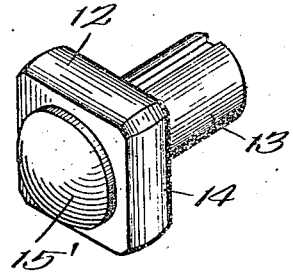
Fig. 4 is a perspective view of the driving head which coöperates with it.

The driving head 12, shown in perspective in Fig. 4, fits within the opening of the wearing member 8, its sides being cylindrical, with axes perpendicular to the axis of the head. The head has a shank 13 which fits within the socket member 3 in line with shaft 1, and is preferably of the same diameter as said shaft, as best shown in Fig. 1. Said shank is keyed or otherwise rigidly fastened to said part 3. The outer end 14 of driving head 12 abuts an annular shoulder 15 formed in part 3 and thus absorbs the thrust of the head outwardly against said part 3. At the inner end the driving head has a spherical portion 15' adapted to bear against the annular shoulder 16, formed in the ball member 6 at a point beyond the inner end of shaft 2. This shoulder is spherically concaved to afford a bearing surface for the ball portion 15' of the driving head and thus absorb the thrust of the driving head toward shaft 2.

The operation will now be readily understood. The torque of the polygonal driving head 12 is transmitted to the wearing element 8, or vice versa, and yet, on account of the cylindrical configuration of the sides of the driving head and the ball and socket configuration of the parts 3, 4, 6, 15 and 16, articulate movement in all directions between the two shafts 1, 2 is permitted. In other words, the torque of shaft 1 is transmitted to shaft 2, or vice versa, and at the same time the typical relative lateral movement of a universal joint is possible. Tension between the two principal members is resisted by the ring 4 and thrust by the inner ball 15'.

This construction produces a simple, durable and efficient joint. As above stated the ring 4 not only fits over the ball member 6 and thus excludes dust, but it also constitutes a tension member because it prevents the two principal elements from being pulled apart,—that is, it resists tension, and it is the sole element relied upon to resist tension. The remaining coöperating parts are effectually inclosed within the socket members 3, 4, and the ball 15 of the driving head efficiently transmits the torque at the same time that it gives a wide range of angular variation between the two principal parts of the mechanism.

Having thus described my invention what I claim as new and desire to secure by Letters Patent, is:—

1. In a universal joint, a ball member, a socket member fitting over it and thereby resisting tension between the two members, the ball member having a socket which is polyangular in cross section taken on a plane perpendicular to the axis of said ball member, the socket member having a polyangular head fitting in the socket in the ball member for transmitting the torque, the sides of the head being cylindrical with radii centering at the axis of the socket member, and means for resisting thrust of one of said members toward the other.

2. In a universal joint a ball member, a two part socket member having an inner part in the form of a ring fitting over the ball member beyond the maximum diameter thereof to resist tension between the ball member and the socket member, the ball member having a socket which is polyangular in cross section taken on a plane perpendicular to the axis of said ball member, the socket member having a polyangular head fitting in the socket in the ball member for transmitting the torque, the sides of the head being cylindrical with radii centering at the axis of the socket member, and means for resisting thrust of one of said members toward the other.

3. In a universal joint, a ball member having a socket of polyangular cross section, a driving head of similar polyangular cross section fitting into said socket, and a socket member forming a housing for the driving head, said socket member being rigidly secured to the driving head and conforming to and partially inclosing said ball member, said socket member being of substantial dimensions to enable it, alone, to withstand the tension between the two principal members of the device.

4. In a universal joint, a ball member, a socket member fitting over it and thereby resisting tension between the two members, the socket member having a driving head of square cross section, the sides of the driving head being cylindrical with their axes perpendicular to the axis of the driving head, the ball member having a chamber of square cross section fitting over the driving head for transmitting torque, the driving head having a spherical portion abutting the ball member for resisting thrust.

5. In a universal joint, a ball member, a socket member fitting over it and having a spherically chambered ring adapted to form the sole means for resisting thrust, a driving head of polyangular cross section, the sides of which are cylindrical, with their axes perpendicular to the axis of the driving head, the ball member having a chamber of polyangular cross section fitting the driving head for transmitting torque, and means at one end of the driving head for resisting thrust, the socket member having an internal annular shoulder against which one side of the driving head abuts for backing up the head when the joint is subjected to thrust.

6. In a universal joint, a ball member, a socket member fitting over it and having a spherically chambered ring adapted to form the sole means for resisting thrust, a driving head of polyangular cross section, the sides of which are cylindrical, with their axes perpendicular to the axis of the driving head, a wearing member secured to the ball member and having an internal opening of polyangular cross section fitting over the driving head for transmitting torque, a means at one end of the driving head for resisting the thrust of the ball member, and means on the socket member for backing up the head when the joint is subjected to thrust.

7. In a universal joint, a ball member, a socket member fitting over it and having a spherically chambered ring adapted to form the sole means for resisting pull, a driving head of polyangular cross section, the sides of which are cylindrical, with their axes perpendicular to the axis of the driving head, a wearing member secured to the ball member and having an internal opening of polyangular cross section fitting over the driving head for transmitting torque, and means at one end of the driving head for resisting thrust, the socket member having an internal annular shoulder against which one side of the driving head abuts for backing up the head when the joint is subjected to thrust.

8. A universal joint having a ball member having a chambered inner end, a wearing member fitting into the chamber in the end of the ball member, means for preventing relative rotation of the parts about the axis of the ball member, said wearing member being internally chambered polygonally, a socket member fitting over the ball member and adapted to resist tension at the joint, sion between the two principal members is resisted by the ring 4 and thrust by the inner ball 15'.

This construction produces a simple, durable and efficient joint. As above stated the ring 4 not only fits over the ball member 6 and thus excludes dust, but it also constitutes a tension member because it prevents the two principal elements from being pulled apart,—that is, it resists tension, and it is the sole element relied upon to resist tension. The remaining coöperating parts are effectually inclosed within the socket members 3, 4, and the ball 15 of the driving head efficiently transmits the torque at the same time that it gives a wide range of angular variation between the two principal parts of the mechanism.

Having thus described my invention what I claim as new and desire to secure by Letters Patent, is:—

1. In a universal joint, a ball member, a socket member fitting over it and thereby resisting tension between the two members, the ball member having a socket which is polyangular in cross section taken on a plane perpendicular to the axis of said ball member, the socket member having a polyangular head fitting in the socket in the ball member for transmitting the torque, the sides of the head being cylindrical with radii centering at the axis of the socket member, and means for resisting thrust of one of said members toward the other.

2. In a universal joint a ball member, a two part socket member having an inner part in the form of a ring fitting over the ball member beyond the maximum diameter thereof to resist tension between the ball member and the socket member, the ball member having a socket which is polyangular in cross section taken on a plane perpendicular to the axis of said ball member, the socket member having a polyangular head fitting in the socket in the ball member for transmitting the torque, the sides of the head being cylindrical with radii centering at the axis of the socket member, and means for resisting thrust of one of said members toward the other.

3. In a universal joint, a ball member having a socket of polyangular cross section, a driving head of similar polyangular cross section fitting into said socket, and a socket member forming a housing for the driving head, said socket member being rigidly secured to the driving head and conforming to and partially inclosing said ball member, said socket member being of substantial dimensions to enable it, alone, to withstand the tension between the two principal members of the device.

4. In a universal joint, a ball member, a socket member fitting over it and thereby resisting tension between the two members, the socket member having a driving head of square cross section, the sides of the driving head being cylindrical with their axes perpendicular to the axis of the driving head, the ball member having a chamber of square cross section fitting over the driving head for transmitting torque, the driving head having a spherical portion abutting the ball member for resisting thrust.

5. In a universal joint, a ball member, a socket member fitting over it and having a spherically chambered ring adapted to form the sole means for resisting thrust, a driving head of polyangular cross section, the sides of which are cylindrical, with their axes perpendicular to the axis of the driving head, the ball member having a chamber of polyangular cross section fitting the driving head for transmitting torque, and means at one end of the driving head for resisting thrust, the socket member having an internal annular shoulder against which one side of the driving head abuts for backing up the head when the joint is subjected to thrust.

6. In a universal joint, a ball member, a socket member fitting over it and having a spherically chambered ring adapted to form the sole means for resisting thrust, a driving head of polyangular cross section, the sides of which are cylindrical, with their axes perpendicular to the axis of the driving head, a wearing member secured to the ball member and having an internal opening of polyangular cross section fitting over the driving head for transmitting torque, a means at one end of the driving head for resisting the thrust of the ball member, and means on the socket member for backing up the head when the joint is subjected to thrust.

7. In a universal joint, a ball member, a socket member fitting over it and having a spherically chambered ring adapted to form the sole means for resisting pull, a driving head of polyangular cross section, the sides of which are cylindrical, with their axes perpendicular to the axis of the driving head, a wearing member secured to the ball member and having an internal opening of polyangular cross section fitting over the driving head for transmitting torque, and means at one end of the driving head for resisting thrust, the socket member having an internal annular shoulder against which one side of the driving head abuts for backing up the head when the joint is subjected to thrust.

8. A universal joint having a ball member having a chambered inner end, a wearing member fitting into the chamber in the end of the ball member, means for preventing relative rotation of the parts about the axis of the ball member, said wearing member being internally chambered polygonally, a socket member fitting over the ball member and adapted to resist tension at the joint, the socket member having an axial bore, a driving head having a shank fitting into the bore in the socket member, the head of the driving head being polyangular in cross section and fitting into the wearing member, the sides of the driving head being cylindrical with axes perpendicular to the axis of the socket member, the driving head and the ball member having coöperating spehrical surfaces adapted to resist end thrust at the joint.

In witness whereof, I have hereunto subscribed my name.

EMIL W. CHALIFOUX.